US009651449B2

(12) United States Patent
Warmerdam et al.

(10) Patent No.: US 9,651,449 B2
(45) Date of Patent: May 16, 2017

(54) SIMULATOR

(71) Applicant: MOOG BV, Nieuw-Vennep (NL)

(72) Inventors: Jean-Paul Warmerdam, Nieuw-Vennep (NL); Jan Hordijk, Nieuw-Vennep (NL); Hanjo Hoogendoorn, Nieuw-Vennep (NL)

(73) Assignee: Moog BV, Nieuw-Vennep (NL)

( * ) Notice: Subject to any disclaimer, the term of this patent is extended or adjusted under 35 U.S.C. 154(b) by 159 days.

(21) Appl. No.: 14/651,000

(22) PCT Filed: Jan. 29, 2013

(86) PCT No.: PCT/EP2013/051678
§ 371 (c)(1),
(2) Date: Jun. 10, 2015

(87) PCT Pub. No.: WO2013/050626
PCT Pub. Date: Apr. 11, 2013

(65) Prior Publication Data
US 2015/0308921 A1 Oct. 29, 2015

(30) Foreign Application Priority Data

Dec. 12, 2012 (EP) ..................................... 12196769

(51) Int. Cl.
G01M 7/02 (2006.01)
G09B 9/12 (2006.01)
G01M 17/00 (2006.01)
G09B 9/00 (2006.01)
G01M 7/06 (2006.01)

(52) U.S. Cl.
CPC .............. G01M 7/06 (2013.01); G01M 7/027 (2013.01); G01M 17/00 (2013.01); G09B 9/00 (2013.01); G09B 9/12 (2013.01)

(58) Field of Classification Search
CPC .......... G09B 9/00; G09B 9/12; G01M 7/027; G01M 17/00; G01M 7/06
USPC .......................................................... 73/663
See application file for complete search history.

(56) References Cited

U.S. PATENT DOCUMENTS

| 4,422,334 | A | | 12/1983 | Yasuda |
| 4,446,742 | A | | 5/1984 | Thompson, Jr. et al. |
| 5,018,973 | A | | 5/1991 | Alet et al. |
| 5,291,787 | A | * | 3/1994 | Laforest .................. G01M 7/06 |
| | | | | 73/663 |

(Continued)

FOREIGN PATENT DOCUMENTS

| CA | 2189840 A1 | 5/1997 |
| CA | 2220877 C | 12/2005 |

(Continued)

OTHER PUBLICATIONS

Dynamic Testing & Equipment,YouTube video entitled "DTE 3-DOF Vibration System Running a Simulated Earthquake Test," https://www.youtube.com/?v=vLDGccz1PgU, uploaded Jun. 7, 2010.

(Continued)

*Primary Examiner* — J M Saint Surin
(74) *Attorney, Agent, or Firm* — Hodgson Russ LLP

(57) ABSTRACT

A movement simulator [100] has at least three translational degrees of freedom and has at least three actuator assemblies [106, 108, 110] each of which having a four bar parallelogram/trapezoidal link arrangement. A stiffener [214] is also disclosed.

15 Claims, 8 Drawing Sheets

(56) References Cited

U.S. PATENT DOCUMENTS

| | | | |
|---|---|---|---|
| 5,618,995 A * | 4/1997 | Otto | G01M 7/06 434/62 |
| 6,058,784 A * | 5/2000 | Carroll | G01N 3/10 73/831 |
| 6,077,078 A | 6/2000 | Alet et al. | |
| 8,607,636 B2 * | 12/2013 | Wu | G01M 7/06 73/663 |
| 2004/0144288 A1 | 7/2004 | Chiang | |
| 2005/0277092 A1 | 12/2005 | Hwang | |
| 2012/0029703 A1 | 2/2012 | Veltena | |
| 2013/0087005 A1 | 4/2013 | Van Lookeren Campagne et al. | |

FOREIGN PATENT DOCUMENTS

| | | |
|---|---|---|
| CN | 1334950 A | 2/2002 |
| CN | 2648525 Y | 10/2004 |
| CN | 201159945 Y | 12/2008 |
| CN | 101339701 A | 1/2009 |
| CN | 201397613 Y | 2/2010 |
| EP | 0980057 A1 | 2/2000 |
| GB | 2328192 A | 2/1999 |

OTHER PUBLICATIONS

Versatile Measuring Instruments, YouTube video entitled "Versatile Measuring Instruments (VMI) Seismic Shaker Table in Action !," https://www.youtube.com/?v=WuGWUNINNi8, uploaded Jan. 21, 2010.
Van Roy, Roland, YouTube video entitled "DIY_motionplatform,_IV_test.mpg," https://www.youtube.com/?v=Ofl-_RTExBc, uploaded Jun. 8, 2010.
Kollmorgen, YouTube video entitled "Kollmorgen Cartridge DDR Motor used in Earthquake Simulator built by ANCO Engineers," https://www.youtube.com/watch?v=JFILA_yo6Bs, uploaded May 25, 2012.

* cited by examiner

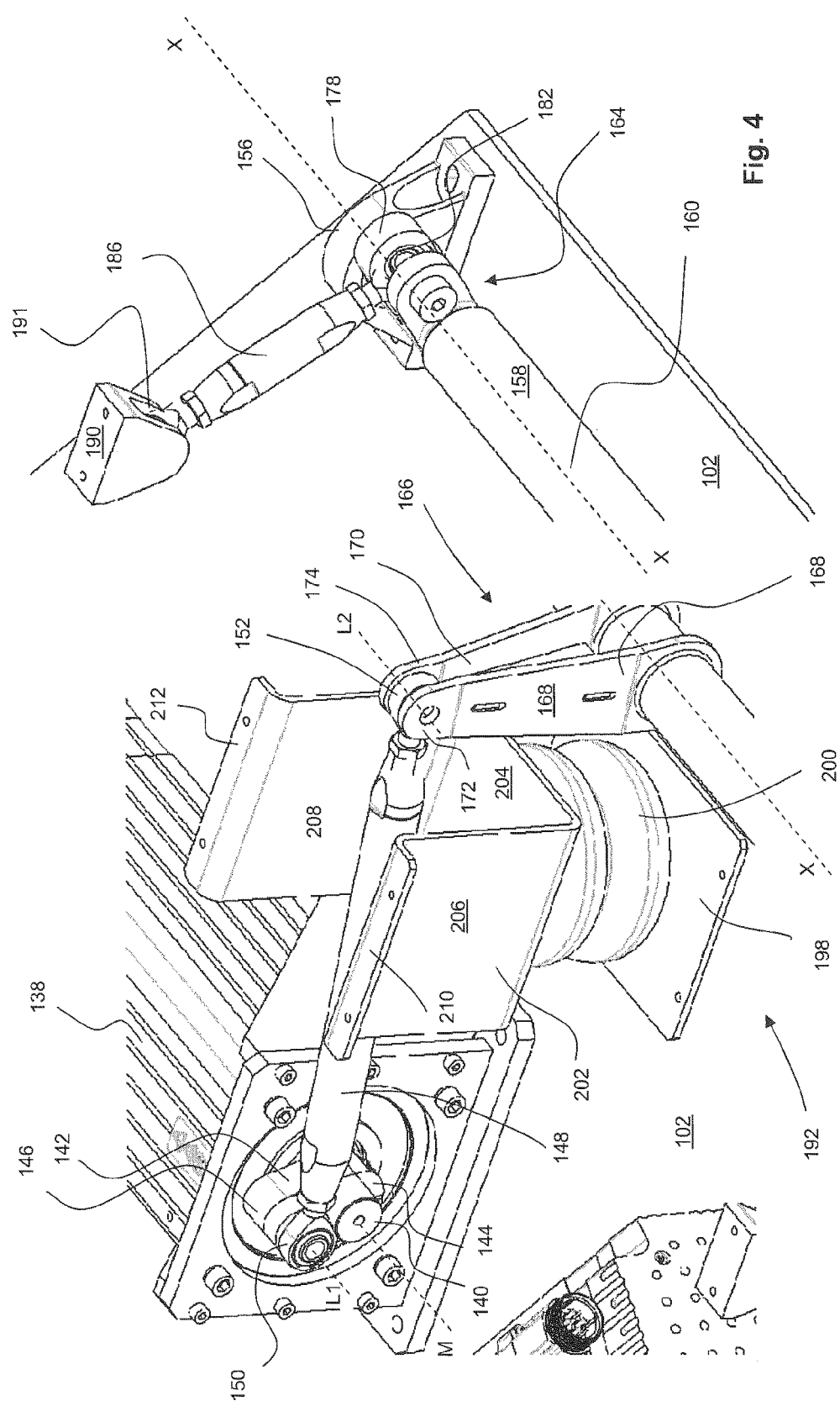

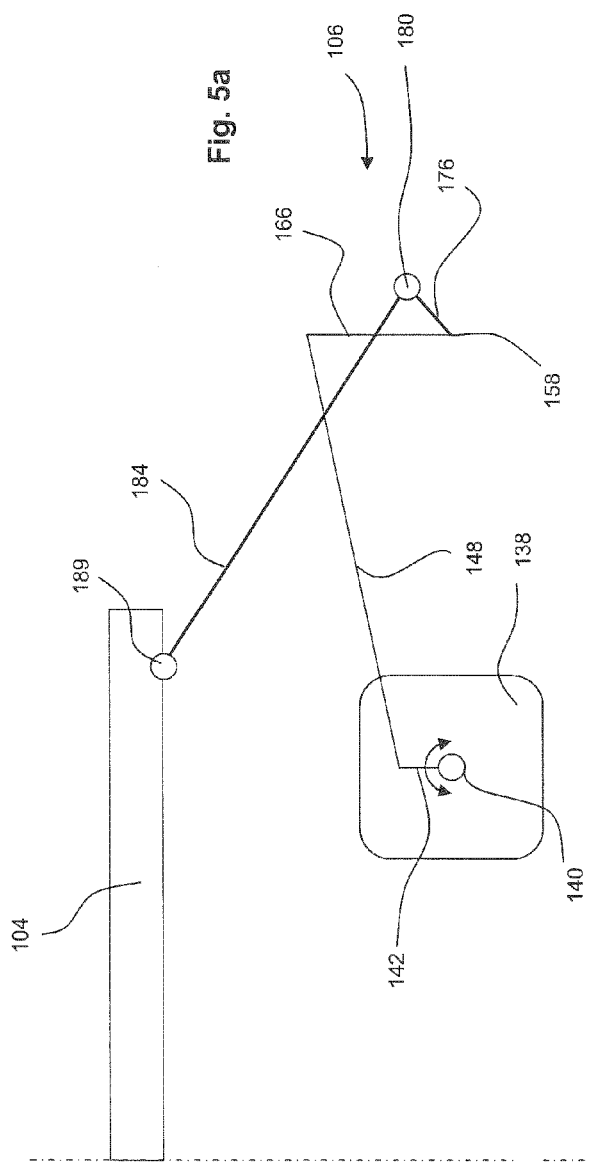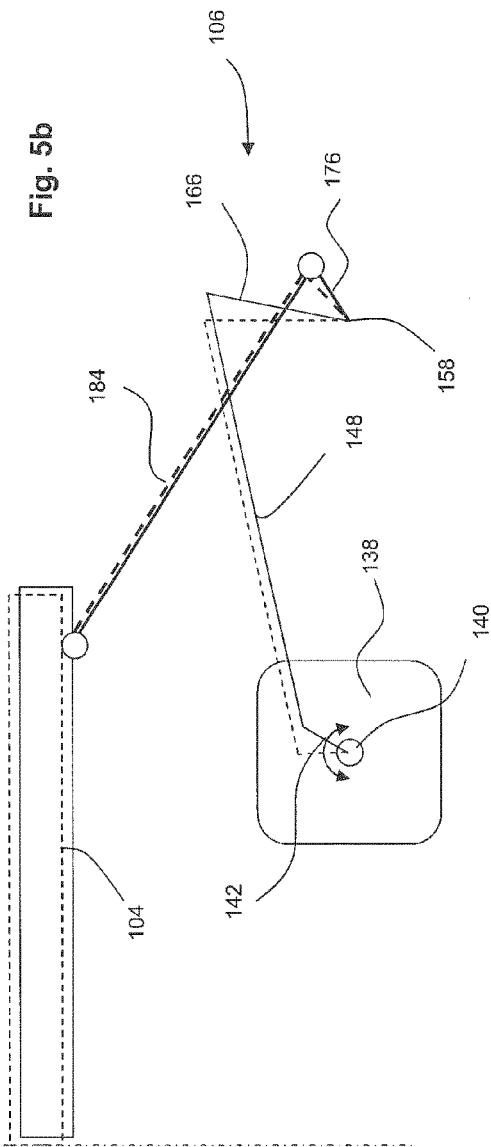

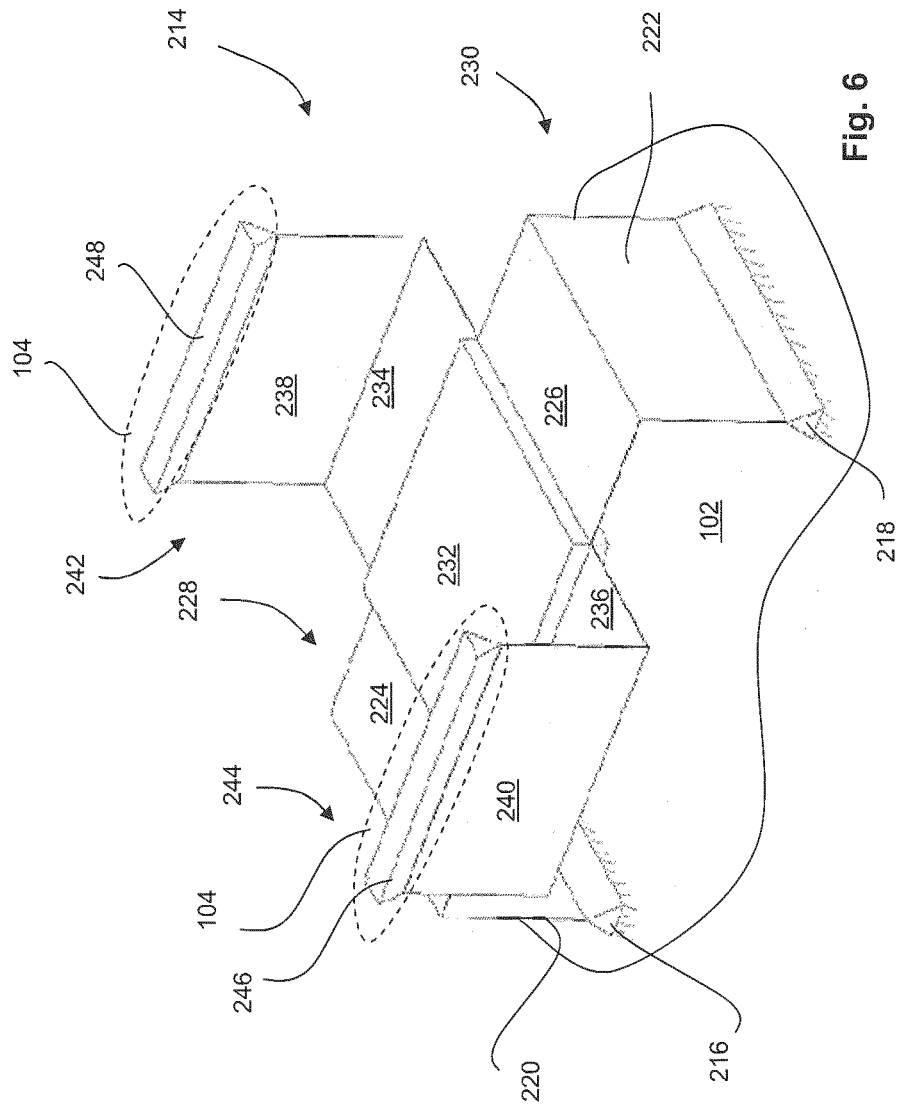

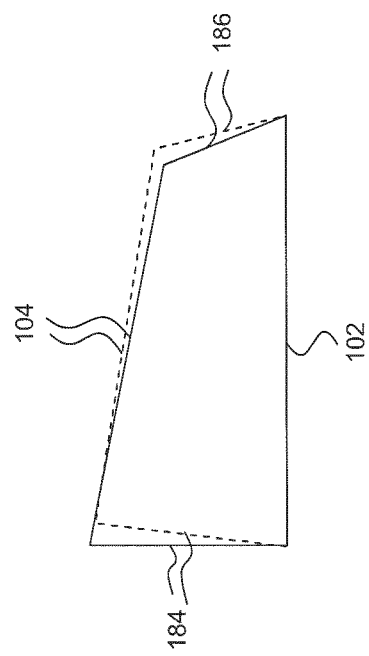

SIMULATOR

CROSS-REFERENCE TO RELATED APPLICATIONS

The present application is the U.S. national phase of International Application No. PCT/EP2013/051678 filed Jan. 29, 2013, which claims priority of European Application No. 12196769.9 filed Dec. 12, 2012, the entirety of which is incorporated herein by reference.

FIELD OF THE INVENTION

The present invention is concerned with a simulator. More specifically, the present invention is concerned with a three-degree of freedom vibration simulator for simulating the effects of translational or combined translational and rotational vibration on an apparatus or subject.

BACKGROUND OF THE INVENTION

Vibration simulators are well known, and generally used to simulate the effects of real world phenomena in a controlled environment (such as a laboratory or workshop). Vibration simulators may be used to test mechanical and electrical equipment to ensure it can withstand the environment in which it will eventually be used. For example, vibration simulators may be used in flight simulators to shake a helicopter cockpit (and thereby the cockpit equipment, seat and pilot) to simulate the high frequency vibration experienced in flight. The effects of such vibration on the pilot and surrounding equipment can be monitored and used to improve pilot skills and training and the design of the cockpit equipment.

Vibration simulators can be used in devices such as vibration platforms, anti-vibration platforms, flight simulators, driving simulators, earthquake simulators, g-seats, seat shakers and vehicle dynamics simulators amongst others. Vibration platforms are required the so-called "Level D" flight simulator standard of civil aviation regulatory authorities.

Various movement simulators exist in the art. One such example is U.S. Pat. No. 6,077,078. The subject device is capable of providing motion in various degrees of freedom and is mounted on a two degree of freedom Cartesian slideway in order to provide movement in perpendicular horizontal directions. A problem with this device is that in order to provide translational movement in all three degrees of freedom, the slideway in combination with the motion platform requires a high number of actuators and it is relatively complex and expensive. It also has a large space requirement.

US 2005/0277092 discloses a seat motion simulator which uses three vertically oriented actuators. Each of the actuators is positioned on a horizontal slideway. As is clear from this document, in order to move the seat in a translational degree of freedom, each actuator has to be moved vertically and horizontally. This particular mechanism is complex and large and is not well suited to in-cockpit simulation of vibration.

SUMMARY OF THE INVENTION

It is an aim of the present invention to provide an improved vibration simulator which is compact and able to provide vibration in at least the three translational degrees of freedom.

According to a first aspect of the present invention there is provided a movement simulator comprising:
a base;
a movable support positioned above the base in use;
at least three movable support actuation assemblies connecting the base to the movable support, each movable support actuation assembly comprising:
an actuator;
a first link having a first end connected to the base such that the first end of the first link is drivable by the actuator to describe an at least part circular locus about a first axis;
a second link having a first end connected to the base such that the first end of the second link is drivable by the actuator to describe an at least part circular locus about the first axis;
in which the first and second links are connected to the movable support at respective second ends;
in which the first and second links comprise universal joints at each of their first and second respective ends;
in which the respective first ends of the first and second links are spaced apart; and,
in which respective second ends of the first and second links are spaced apart.

Advantageously, this type of mechanism allows movement in three translational degrees of freedom and only requires the three actuators (one per actuation assembly). Each assembly forms a four bar-linkage with the base and movable support which can be actuated to move the movable support relative to the base, but also allows relative movement thereof when one of the other actuation assemblies moves.

By "universal joint" we mean any joint which is movable in at least two degrees of freedom—for example a cardan joint or spherical joint.

The movable support may be a platform or a loading frame with a plurality of attachment points for the equipment on which simulation or testing is to be performed.

Preferably at least one movable support actuation assembly comprises a first crank mounted to the base for rotation about the first axis, which first crank, is connected to the universal joint at the first end of the first link. Preferably the first crank extends radially from an axle. Preferably a second crank is provided extending radially from the axle, which second crank is connected to the universal joint at the first end of the second link.

The crank can be driven in rotation to drive the movable support through rotational motion. This is advantageous because rotary actuators are preferable to linear actuators, particularly in high frequency applications such as vibration simulation. Linear actuators also need a brake to stop them in emergency situations (to prevent the platform from falling—e.g. when using a hexapod) whereas rotary actuators in the configuration according to the invention do not.

The axle may be driven directly, or preferably the assembly comprises a driving crank extending radially from the axle, which driving crank is driven by the actuator. This allows further gearing of the actuator. The driving crank may be driven by a push rod, which in turn is driven by an actuator crank driven in rotation by the actuator.

Preferably the actuator crank is arranged to be driven through 360 degrees. This means the motor does not have to continually change direction; an advantage for vibration simulation in particular.

The actuators may be positioned internally—that is within the area bounded by the first ends of the links- or where the support actuation assemblies are mounted to the base. This makes the arrangement more compact.

Alternatively, the actuators may be positioned externally—that is outside the area bounded by the first ends of the links- or where the support actuation assemblies are mounted to the base. This makes replacement and service of the actuators easier, and allows larger actuators to be used.

Preferably:

the first link has a first length;

the second link has a second length; and, in which the distance between the first respective ends of the links, and the second respective ends of the links is greater than either the first length or the second length.

This aspect ratio of the four bar link is preferable for vibration simulation because although the range of motion of the platform is reduced, the stiffness of the assembly is increased. Small movements at high frequency are ideal for vibration simulation, in particular for helicopter cockpit simulation, and as such this aspect ratio of the four-bar link is advantageous.

Preferably the distance between the first respective ends of the links, and the second respective ends of the links is at least three times either the first length or the second length, preferably at least five times either the first length or the second length. (That is, at least three or five times their individual lengths).

Alternatively, if a large amplitude of vibration is required, the aspect ratio of the four bar link can be altered such that the individual lengths of the first and second links is equal to, or greater than the distance between their ends. This arrangement, although less stiff than the previous embodiment, provides a higher degree of travel for higher-amplitude vibration. Under these circumstances, further stiffening may be required as discussed below, and with respect to the second aspect.

Preferably there is provided at least one stiffening assembly forming a load path between the base and the movable support independent of the movable support actuation assemblies. Preferably the stiffening assembly comprises a resilient member which is less stiff in translation than rotation.

The four bar link arising from the geometry of the actuation assembly may have various shapes. The first link and the second link may have the same length, in which case the four bar link would be a parallelogram (if both ends of the links are equally spaced from one another) or a trapezium (if not).

According to a second aspect of the invention there is provided a movement simulator comprising:

a base;

a movable support positioned above the base in use;

a stiffener extending between the base and the movable support, which stiffener comprises:

a first generally U-shaped region attached to the base at its respective ends; and, a second generally U-shaped region attached to the movable support at its respective ends;

in which the first U-shaped region is joined to the second U-shaped region between their respective ends, and in which the U-shaped regions are at an angle to each other about a yaw axis extending between the base and movable support in use.

Advantageously, this arrangement provides support but suppresses rotation about the yaw axis, which is important in vibration simulation, particularly with an arrangement according to the first aspect which is susceptible to undesirable yaw rotation.

Preferably the stiffener comprises:

a first and second leg, each attached to the base and connected to define the first U-shaped region;

a first and second arm, each attached to the movable support and connected to define the second U-shaped region;

in which the legs and arms are constructed from a resilient sheet material.

The legs and arms may join at a region normal to the yaw axis. This plate like central region provides yaw stiffness.

Preferably the legs and arms are L-shaped, with a portion of each leg and arm being co-planar and normal to the yaw axis. This allows the legs and arms to act as leaf springs.

BRIEF DESCRIPTION OF THE DRAWING VIEWS

An example vibration simulator in accordance with the present invention will now be described with reference to the accompanying figures in which:—

FIG. 3 is a detail view of a part of the simulator FIG. 1 with the motion platform omitted for clarity;

FIG. 4 is a detail view of a further part of the simulator of FIG. 1 with the motion platform omitted for clarity;

FIGS. 5a and 5b are side schematic views of an actuator of the simulator of FIG. 1;

FIG. 6 is a perspective view of a part of a second vibration simulator in accordance with the present invention;

FIGS. 7a-7e are schematic views of five different geometric configurations of part of an actuator for a simulator in accordance with the present invention; and, FIG. 8 is a perspective view of a third vibration simulator in accordance with the present invention.

DETAILED DESCRIPTION OF THE INVENTION

Figure 1:
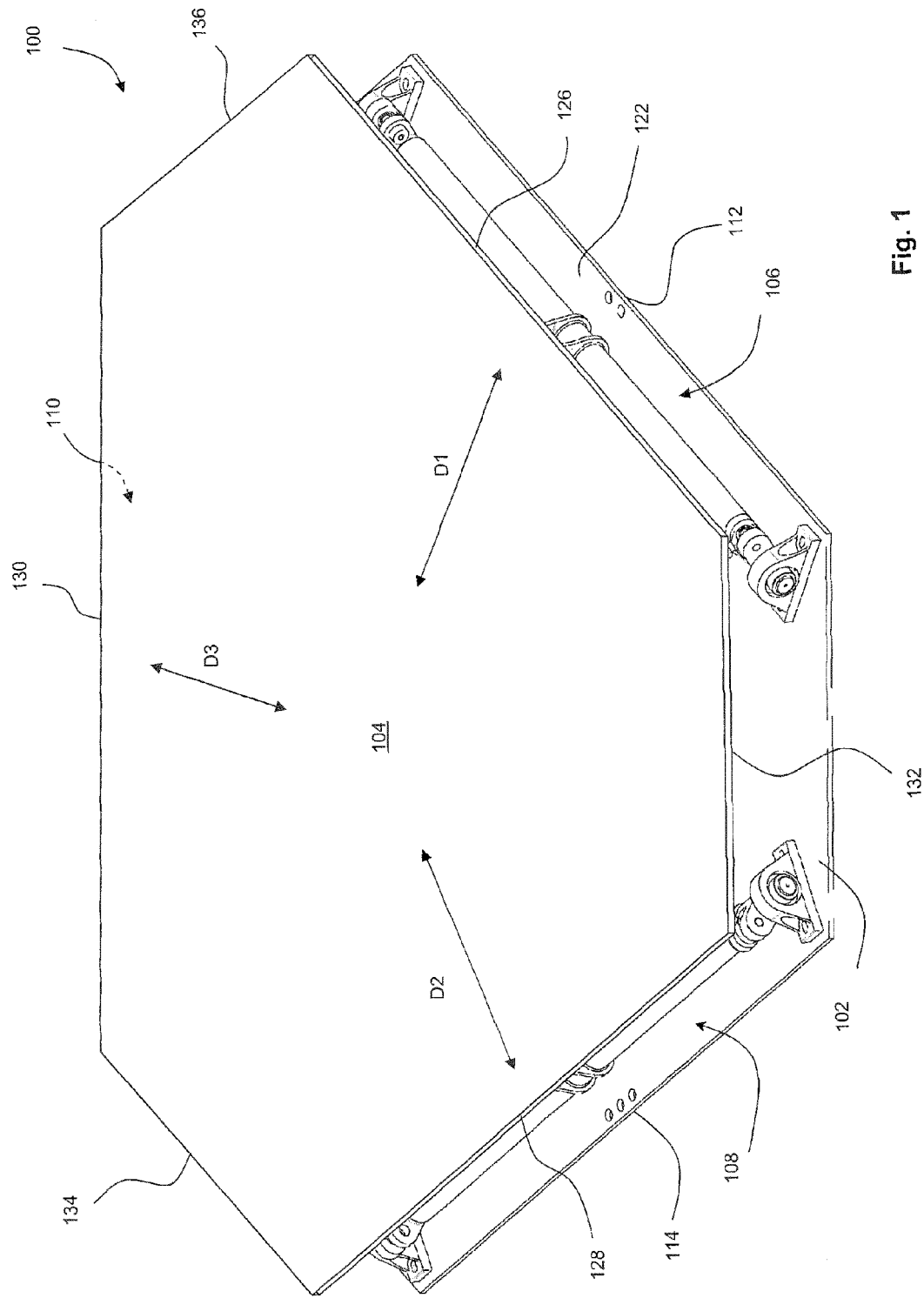
FIG. 1 is a perspective view of a first vibration simulator in accordance with the present invention.

Turning to FIGS. 1 to 4, a vibration simulator 100 in accordance with the present invention is shown. The vibration simulator 100 comprises a base 102, a movable support in the form of a platform 104 positioned above the base in use, and three individual platform actuation assemblies 106, 108, 110 driving the platform 104 relative to the base 102, as will be described below. The platform 104 is also supported on three support assemblies 192, 194, 196.

The base 102 is a flat, plate-like member shaped as an irregular pentagon in profile. The base 102 is in the shape of a triangle having three long sides 112, 114, 116 with each corner of the triangle truncated to provide three short sides 118, 120, 122. The base 102 is mounted on a surface (usually a floor) in use. Alternatively the base can be the floor with the relevant components attached directly thereto.

Turning to the platform 104, it is similar to the base 102 in as much that it is an irregular pentagon shape formed from a triangle having long sides 126, 128, 130 with truncated corners forming short sides 132, 134, 136. In this embodiment the platform 104 is identically shaped to the base 102 and in a neutral position of the actuator assembles 106, 108, 110, is vertically offset relative thereto.

Figure 2:
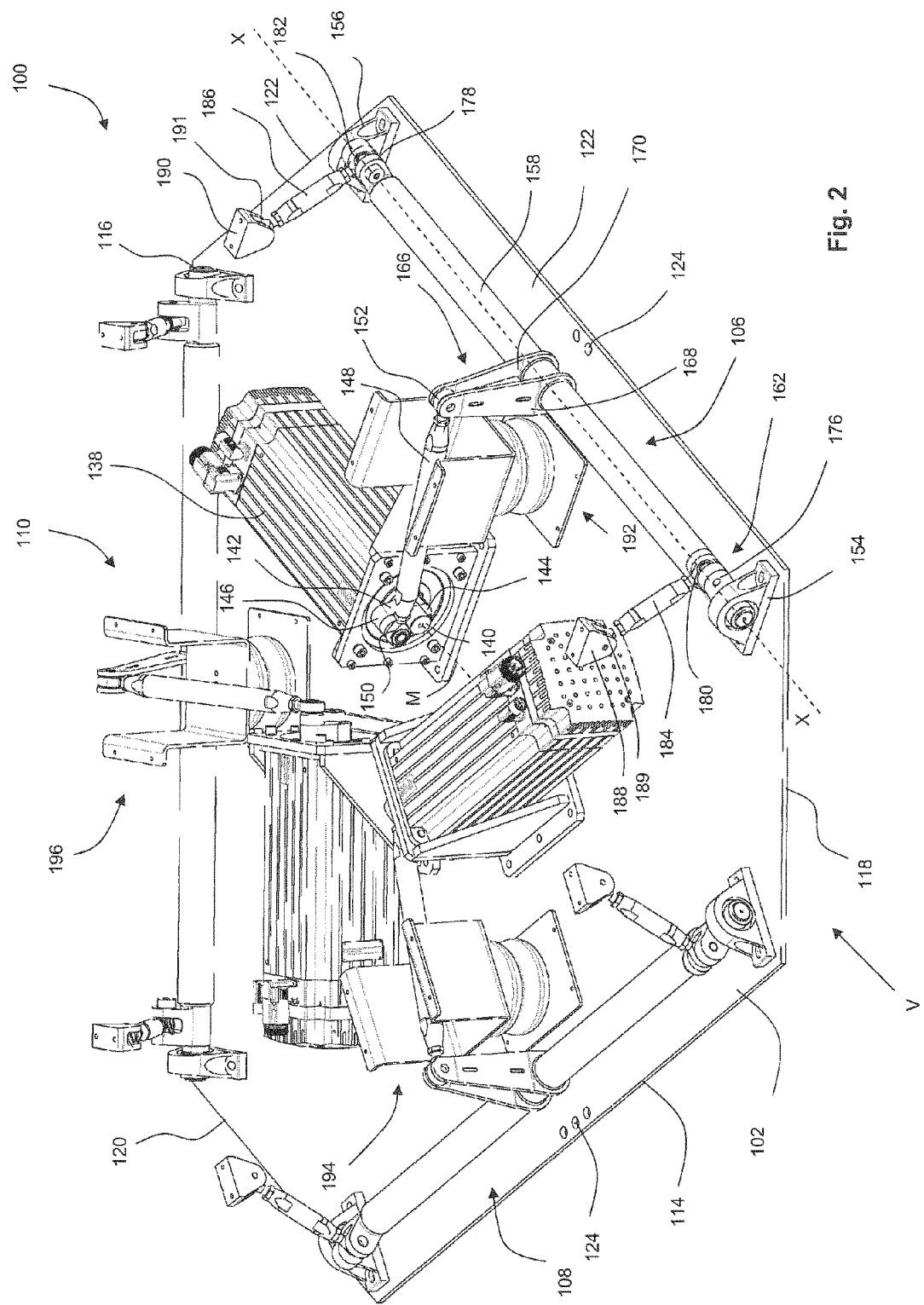
FIG. 2 is a view of the simulator of FIG. 1 with the motion platform omitted for clarity.

In FIG. 2 the platform 104 is omitted such that the first, second and third actuation assemblies 106, 108, 110 are visible. The three actuation assemblies 106, 108, 110 are substantially identical (apart from their orientation relative to the base 102) and as such only the first actuation assembly 106 will be described in detail.

The first actuation assembly 106 comprises an electric motor 138 having an output shaft 140 which is driven in rotation about a motor axis M by the motor 138. A motor crank 142 is provided having a first shaft attachment 144 at a first end and a second shaft attachment 146 at a second opposite end.

An adjustable link arm 148 is provided, having a first shaft attachment 150 defined at a first end, and a second shaft attachment 152 at a second opposite end. The shaft attachment formations 150, 152 are formed as spherical rotational joints with multiple rotational degrees of freedom. The adjustable link 148 can be adjusted in length in a known manner, and as required when setting up the simulator 100.

The first actuation assembly 106 comprises a first axle mount 154 and a second axle mount 156. Each axle mount 154, 156 is attached to the base 106 such that it is rigidly attached thereto. Each axle mount 154, 156 comprises a bearing suitable for receiving an axle. Each bearing is a cylindrical joint able to provide movement in a single rotational degree of freedom. The axle mounts 154, 156 are spaced apart and proximate opposite ends of the long side 112 of the base 102. The joint axes of the axle mounts 154, 156 are aligned and parallel with a single joint axis X. The joint axis X is slightly offset from the first long side 112 towards the centre of the base 102.

An axle 158 is provided which generally comprises an elongate tube 160 having stub axles 162, 164 respectively positioned at either end.

A driving crank 166 is positioned and fixed at the axial centre of the axle 158. The driving crank 166 comprises a first plate 168 and a second plate 170, which are offset parallel, mirror images of each other. At the free end of the driving crank 166 (opposite the axle 158) there is provided a shaft receiving formation 172, 174 on each of the plates 168, 170 respectively. The shaft receiving formation 172, 174 is connected to the spherical joint attachment formation 152 which allows rotation in all rotational degrees of freedom.

At each end of the axle 158, there is provided a first axle crank 176 and a second axle crank 178 respectively, each projecting radially therefrom. Each of the axle cranks 176, 178 is fixed to the axle 158 and each crank defines a respective spherical joint 180, 182 at the end opposite the axle 158.

A first adjustable axle tie rod 184 and a second adjustable axle tie rod 186 are provided and are adjustable in length as known in the art.

A first tie rod mount 188 and a second tie rod mount 190 are provided and attached to the underside of the platform 104 at respective ends of the first long side 126. Each tie rod mount comprises a spherical joint 189, 191 respectively.

The first actuator assembly 106 is assembled as follows.

Referring to FIG. 3, the output shaft 140 is connected to the first shaft attachment point 144 on the crank arm 142 such that the crank arm 142 rotates about the motor axis M as the shaft 140 is driven by the motor 138. The second shaft attachment 146 of the crank arm 142 is attached to the first shaft attachment 150 of the adjustable link 148 via a stub shaft such that the link 148 is free to rotate relative to the crank arm 142 about a first link axis L1, as well as perform minor rotations about axes perpendicular to L1 (because the attachment 150 is a spherical joint). It will be noted that the crank arm 142 is configured so as the output shaft 140 does not interfere with a 360 degree rotation of the crank arm 142, and does not foul on the adjustable link 148 as it rotates through 360 degrees. Therefore, the actuator 138 can be continuously driven.

The second shaft attachment 152 of the adjustable link 148 is positioned between the shaft receiving formations 172, 174 of the plates 168, 170 of the driving crank 166. The components are attached together such that the adjustable link 148 can rotate about a second link axis L2 relative to the driving crank 166 (N.B. the link 148 can also perform minor rotation about other axes because the attachment formation 152 is a spherical joint). The motor axis M, first link axis L1 and second link axis L2 are parallel.

The axle 158 is mounted for rotation about the joint axis X which is also parallel to the motor axis M, first link axis L1 and second link axis L2.

Each of the axle tie rods 184, 186 is attached to the spherical joints 180, 182 of the axle cranks 176, 178 such that the axle tie rods 184, 186 can rotate relative to the axle cranks 176, 178 in all three rotational degrees of freedom. The axle tie rods 184, 186 are positioned next to the respective axle mounts for stiffness.

Each tie rod 188, 190 is attached to the underside of the platform 104. The tie rod mounts 188, 190 are generally mounted parallel to and offset from the axle 158 such that a line drawn between the tie rod mounts 188, 190 is parallel to, and offset from, the first long side 126 of the platform 104 and towards the centre of the platform 104.

The tie rods 184, 186 are parallel and of equal length and thus form a four bar link in the form of a parallelogram at all positions of the platform 104 relative to the base 102. The platform 104 is thereby always parallel to the base 102 and does not rotate. This range of motion is shown schematically in FIG. 7*a*.

The four bar link formed by the tie rods 184, 186, the base 102 and the platform 104 is characterised in that the rods 184, 186 are shorter in length than the distance between their respective ends. In other words at both ends, the tie rods 184, 186 are spaced apart by a distance further than their respective lengths. This provides stability to the mechanism, and stiffness to the simulator 100, which undergoes very high reaction forces in use. It will also be noted that the tie rods 184, 186 are not vertical, and are not perpendicular to the respective planes of the base 102 and platform 104. This also confers stiffness on the simulator 100.

Referring to FIGS. 5*a* and 5*b*, operation of the first actuator assembly 106 is shown schematically. FIGS. 5*a* and 5*b* are schematic views from direction V in FIG. 2.

Comparing FIGS. 5*a* and 5*b*, FIG. 5*a* shows the actuator 106 in its starting, neutral position. The position of the platform 104 once it has moved by a small clockwise rotation of the output shaft 140 of the motor 138 is shown in FIG. 5*b* (with the starting position in hidden line). As can be seen in FIG. 5*b*, rotation of the crank arm 142 pushes the adjustable link 148, which in turn rotates the driving crank 166 and thereby the axle 158 about its primary axis. The axle cranks 176, 178 are also rotated in a clockwise fashion thus pulling the axle tie rods 184, 186 and lowering the platform 104.

As shown in FIG. 2, each of the three actuator assemblies 106, 108, 110 is positioned 120 degrees apart. In other words they are equally spaced about the base 102 and platform 104.

Movement provided by the actuator assembly 106 urges the platform 104 in a first direction D1. This is clearly at a 120 degree angle to the movement provided by either actuator assembly 108, 110 (D2 and D3 respectively). Such motion is permitted by the parallelogram linkage made up by the axle 158, axle tie rods 184, 186 and the platform 104.

The fact that each actuator assembly 106, 108, 110 has a parallelogram linkage means that translational movement in all three degrees of freedom of the platform (i.e. surge in a fore-aft direction, sway in a side-to-side direction and heave in a vertical direction) is possible.

It will be noted that each of the three actuator assemblies 106, 108, 110 can be simultaneously or alternately activated in order to provide motion in one or more of the three translational degrees of freedom.

As can be seen in FIG. 2, the platform 104 is mounted on support assemblies 192, 194, 196. Each of the support assemblies 192, 194, 196 is substantially identical and as such only the support assembly 192 will be described in detail here.

Referring to FIG. 3, the support assembly 192 comprises a base plate 198 which is attached to the base 102. A shock absorbing cushion 200 extends vertically from, and perpendicular to, the base plate 198 and is connected to a platform mount 202. The mount 202 is u-shaped, having a base 204 connected to the cushion 200 and two upwardly extending side panels 206, 208 which terminate in two outwardly extending flanges 210, 212 which are configured to be mounted to the platform 104. In order to make the assembly as compact as possible, and to provide adequate support for the platform 104, each of the platform mounts 202 encloses part of the actuator assembly 106, specifically the adjustable link 148 which sits between the side panels 206, 208 within the u-section. The cushions 200 also support the static weight of the payload on the platform 102.

An alternative or additional method of inhibiting yaw rotation (i.e., rotation about a vertical axis) can be seen in FIG. 6. FIG. 6 shows a yaw inhibiting platform support 214 having a first foot 216 and a second foot 218 configured to be connected to the base 102.

Each foot 216, 218 is connected to a vertical plate-like member 220, 222 respectively, and each plate member 220, 222 to a horizontal member 224, 226 respectively. As such, two legs 228, 230 are formed which are generally shaped as inverted 'L' shapes in cross-section.

Between the legs 228, 230 there is provided a relatively stiff centre plate 232 which connects the horizontal members 224, 226. The centre plate 232 is square and the horizontal members 224, 226 connect to it along two opposing sides. Extending from the remaining sides of the centre plate 232, there are provided two further horizontal members 234, 236 which are similar to the horizontal members 224, 226, but extend at 90 degrees thereto in a horizontal plane. The horizontal members 234, 236 are joined to two further vertical members 238, 240. The horizontal members and vertical members thereby form two "L" shaped arms 242, 244 respectively. Each of the arms 242, 244 terminates in a platform mount 246, 248 which connect to the platform 104.

Each of the legs 228, 230 and arms 242, 244 are constructed from a material selected to be flexible and resilient in bending, but stiff in shear (such as sheet metal). As such, each of these members act as a leaf spring. The "L" shape of the arms and legs and the fact that they are disposed at 90 degrees to each other, means that the support 214 permits some movement in all three translational directions and also permits rotation of the platform relative to the base about both horizontal axes. The one degree of freedom that is severely constrained by the support 214 is the yaw degree of freedom; that is rotation about a vertical axis. This is mainly due to the way that the centre plate 232 and horizontal members 224, 226, 234, 236 are horizontally oriented.

Variations fall within the scope of the present invention.

For example, the tie rod mounts 188, 190 may be moved to adjust the orientation of the tie rods 184, 186. FIG. 7a, shows the parallel, equal length tie rods which ensure a non-rotating platform 104 (as described above).

Figure 7B:
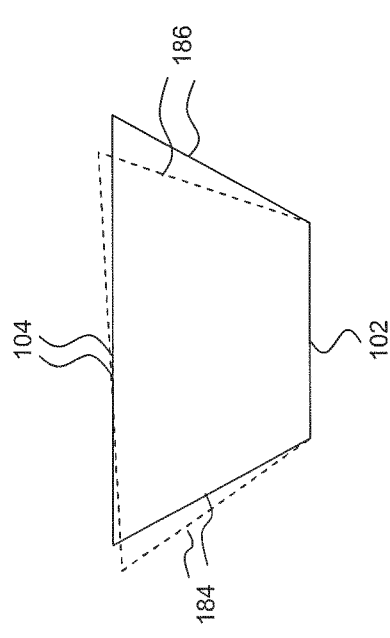

As shown in FIG. 7b, non parallel, equal length rods which diverge toward the platform results in translational and rotational motion about a point below the platform. This may be useful for e.g. earthquake simulation.

Figure 7D:
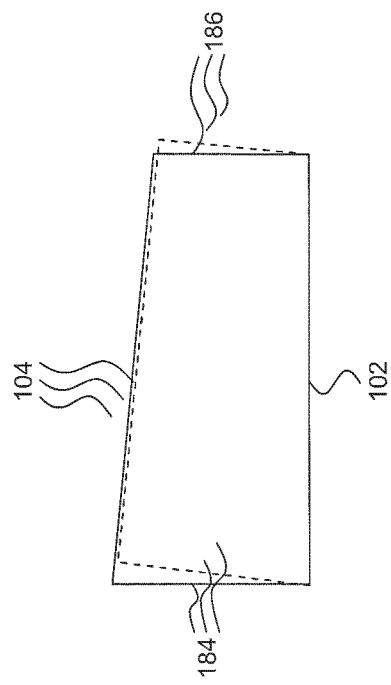
Figure 7A:
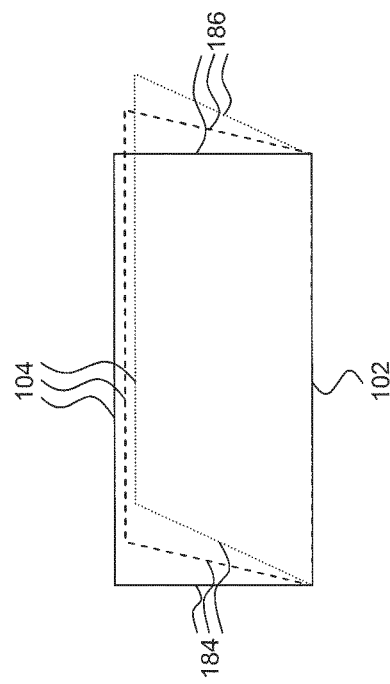
Figure 7C:
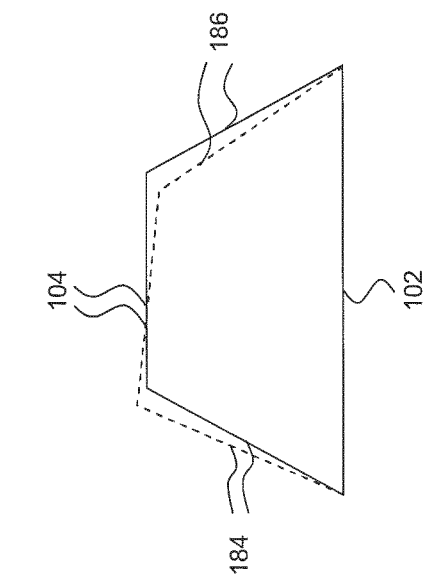

As shown in FIG. 7c, non parallel, equal length tie rods provide rotation about a point above the platform. This may be useful for assessing the vibration of e.g. suspended structures.

The embodiments of FIG. 7d (non equal lengths, but parallel) and FIG. 7e (non equal lengths and not parallel) also provide different types of motion.

Figure 8:
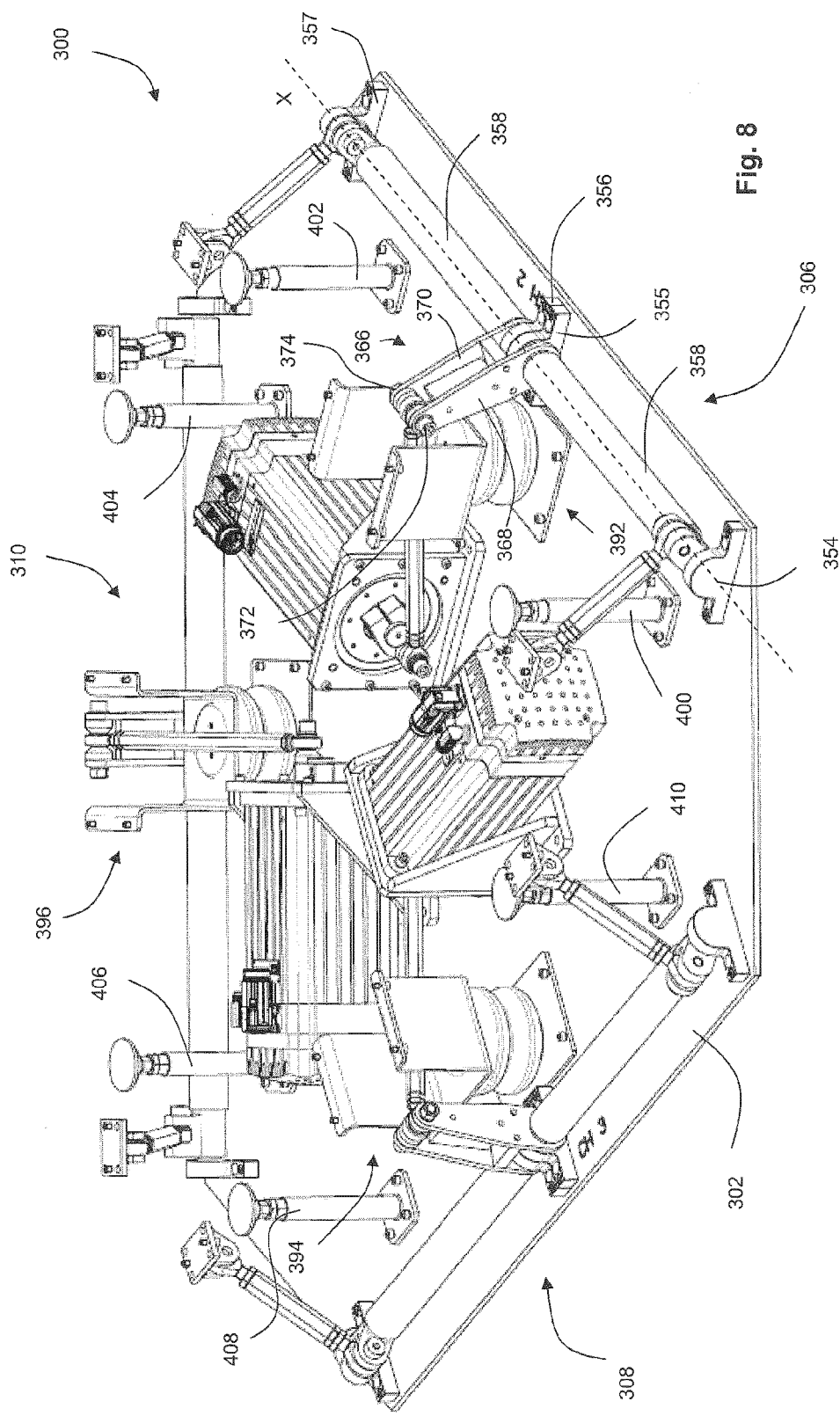

Turning to FIG. 8, a vibration simulator 300 is shown which is similar to the simulator 100. Like the simulator 100, the simulator 300 comprises a base 302, a movable support it the form of a platform (not shown) positioned above the base in use, and three individual platform actuation assemblies 306, 308, 310 driving the platform relative to the base 302, as will be described below. The platform is also supported on three support assemblies 392, 394, 396.

The differences between the simulators 100 and 300 are discussed below.

Instead of two axle mounts 154, 156, the first actuation assembly 306 comprises a first axle mount 354, a second axle mount 355, a third axle mount 356 and a fourth axle mount 357. Each axle mount 354, 355, 356, 357 is attached to the base 306 such that it is rigidly attached thereto. Each axle mount 354, 355, 356, 357 comprises a bearing suitable for receiving an axle. Each bearing is a cylindrical joint able to provide movement in a single rotational degree of freedom. The joint axes of the axle mounts 354, 355, 356, 357 are aligned and parallel with a single joint axis X.

A axle 358 is provided. The axle 358 is mounted for rotation about the axis X, and is supported between the first and fourth axle mounts 354, 357. The axle is also supported mid-way along by the third and fourth axle mounts 356, 357. The second and third axle mounts 355, 356 are adjacent.

Like the simulator 100, a driving crank 366 is positioned and fixed at the mid-point of the axle 358, either side of the third and fourth mounts 355, 356. The driving crank 366 comprises a first plate 368 and a second plate 370, which are offset parallel, mirror images of each other. At the free end of the driving crank 366 (opposite the axles 358, 359) there is provided a shaft receiving formation 372, 374 on each of the plates 368, 370 respectively. The shaft receiving formations 372, 374 are connected to a push rod in much the same way as the simulator 100.

Provision of two extra supports in the centre of the axle allows for greater stiffness and stability.

FIG. 8 also shows six optional, temporary supports, 400, 402, 404, 406, 408, 410. These supports hold the platform in place if any of the actuation assemblies or permanent supports need to be serviced or replaced.

The invention claimed is:

1. A movement simulator (100) comprising:
   a base (102);
   a movable support (104) positioned above the base (102) in use;
   at least three movable support actuation assemblies (106, 108, 110) connecting the base to the movable support (104), each movable support actuation assembly (106, 108, 110) comprising:
   an actuator (138);
   a first link (184) having a first end connected to the base (102) such that the first end of the first link (184) is drivable by the actuator to describe an at least part circular locus about a first axis (X);

a second link (186) having a first end connected to the base (102) such that the first end of the second link (186) is drivable by the actuator to describe an at least part circular locus about the first axis (X);

in which the first and second links (184, 186) are connected to the movable support (104) at respective second ends;

in which the first and second links (184, 186) comprise universal joints (180, 182) at each of their first and second respective ends;

in which the respective first ends of the first and second links (184, 186) are spaced apart; and, in which respective second ends of the first and second links (184, 186) are spaced apart.

2. A movement simulator (100) according to claim 1, in which the movable support is a platform.

3. A movement simulator (100) according to claim 1, in which at least one movable support actuation assembly (106, 108, 110) comprises:

a first crank (176) mounted to the base for rotation about the first axis (X), which first crank (176) is connected to the universal joint (180) at the first end of the first link (184).

4. A movement simulator (100) according to claim 3, in which at least one movable support actuation assembly (106, 108, 110) comprises an axle (158) mounted to the base for rotation about the first axis, and the first crank (176) extends radially from the axle.

5. A movement simulator (100) according to claim 4, in which at least one movable support actuation assembly (106, 108, 110) comprises a second crank (178) extending radially from the axle (158), which second crank (178) is connected to the universal joint (182) at the first end of the second link (186).

6. A movement simulator (100) according to claim 4, in which in at least one movable support actuation assembly (106, 108, 110) the actuator directly drives the axle (158).

7. A movement simulator (100) according to claim 4, in which at least one movable support actuation assembly (106, 108, 110) comprises a driving crank (166) extending radially from the axle (158), which driving crank (166) is driven by the actuator (138).

8. A movement simulator (100) according to claim 7, in which in at least one movable support actuation assembly (106, 108, 110) the driving crank (166) is driven by a push rod (148), which in turn is driven by an actuator crank (142) driven in rotation by the actuator (138).

9. A movement simulator (100) according to claim 8, in which in at least one movable support actuation assembly (106, 108, 110) the actuator crank (142) is arranged to be driven through 360 degrees.

10. A movement simulator (100) according to claim 1, in which in at least one movable support actuation assembly (106, 108, 110):

the first link (184) has a first length;

the second link (186) has a second length; and, in which the distance between the first respective ends of the links, and the second respective ends of the links is greater than either the first length or the second length.

11. A movement simulator (100) according to claim 1 comprising at least one stiffening assembly (192) forming a load path between the base and the movable support independent of the movable support actuation assemblies (106, 108, 110).

12. A movement simulator (100) according to claim 11 in which the stiffening assembly (192) comprises a resilient member (200) which is less stiff in translation than rotation.

13. A movement simulator (100) according to claim 1, in which in at least one movable support actuation assembly (106, 108, 110):

the first link (184) and the second link (186) have the same length.

14. A movement simulator (100) according to claim 13, in which in at least one movable support actuation assembly (106, 108, 110):

the respective first ends of the first and second links (184, 186) are spaced apart by a distance; and, the respective second ends of the first and second links (184, 186) are spaced apart by the same distance as the respective first ends.

15. A movement simulator (100) according to claim 13, in which in at least one movable support actuation assembly (106, 108, 110):

the respective first ends of the first and second links (184, 186) are spaced apart by a first distance; and, the respective second ends of the first and second links (184, 186) are spaced apart by a second distance, different to the first distance.

* * * * *